US012383795B2

(12) United States Patent
Köstlmeier et al.

(10) Patent No.: US 12,383,795 B2
(45) Date of Patent: Aug. 12, 2025

(54) AVALANCHE AIRBAG, METHOD FOR MANUFACTURING AN AVALANCHE AIRBAG AND AVALANCHE AIRBAG SYSTEM

(71) Applicants: Ortovox Sportartikel GmbH, Taufkirchen (DE); AMER Sports Canada Inc., Burnaby (CA)

(72) Inventors: Manfred Köstlmeier, Haar/Gronsdorf (DE); Johannes Kuntze-Fechner, Bad Tölz (DE); Christian Bier, Miesbach (DE)

( * ) Notice: Subject to any disclaimer, the term of this patent is extended or adjusted under 35 U.S.C. 154(b) by 767 days.

(21) Appl. No.: 17/542,613

(22) Filed: Dec. 6, 2021

(65) Prior Publication Data

US 2022/0184458 A1 Jun. 16, 2022

(30) Foreign Application Priority Data

Dec. 8, 2020 (DE) ......................... 102020132608.4

(51) Int. Cl.
*A63B 29/02* (2006.01)
*A62B 33/00* (2006.01)

(52) U.S. Cl.
CPC ............ *A63B 29/021* (2013.01); *A62B 33/00* (2013.01)

(58) Field of Classification Search
CPC .............................. A63B 29/021; A62B 33/00
See application file for complete search history.

(56) References Cited

U.S. PATENT DOCUMENTS

| | | | | | |
|---|---|---|---|---|---|
| 2,529,961 | A | * | 11/1950 | Phillips | B63B 34/52 441/131 |
| 4,973,278 | A | * | 11/1990 | Williams | B63B 34/565 441/131 |
| 5,618,595 | A | * | 4/1997 | Matsushima | B32B 1/00 442/183 |
| 6,158,380 | A | * | 12/2000 | Aschauer | A62B 99/00 116/210 |
| 6,220,909 | B1 | | 4/2001 | Aschauer | |
| 2017/0216680 | A1 | | 8/2017 | Neubauer et al. | |

FOREIGN PATENT DOCUMENTS

| | | | |
|---|---|---|---|
| EP | 0957994 | B1 | 12/2001 |
| EP | 2807937 | B1 | 12/2014 |
| EP | 3127584 | A1 | 2/2017 |

* cited by examiner

*Primary Examiner* — Stephen P Avila
(74) *Attorney, Agent, or Firm* — Bradley Arant Boult Cummings LLP; Jacob W. Neu; Alex H. Huffstutter

(57) ABSTRACT

The invention relates to an avalanche airbag (2), comprising a deployable outer bag (12), consisting of a flexible, gas-permeable material, and a deployable inner bag (13), consisting of a gas-tight elastic material and inflatable with gas, whereby the inner bag (13) is arranged inside the outer bag (12). The material of the inner bag (13) has an elasticity of at least 25%. The avalanche airbag (2) facilitates rapid deployment after activation over the entire temperature range as well as a small pack volume with a low total weight. Furthermore, the invention relates to a method for manufacturing an avalanche airbag (2) and an avalanche airbag system.

20 Claims, 4 Drawing Sheets

Figure 1:
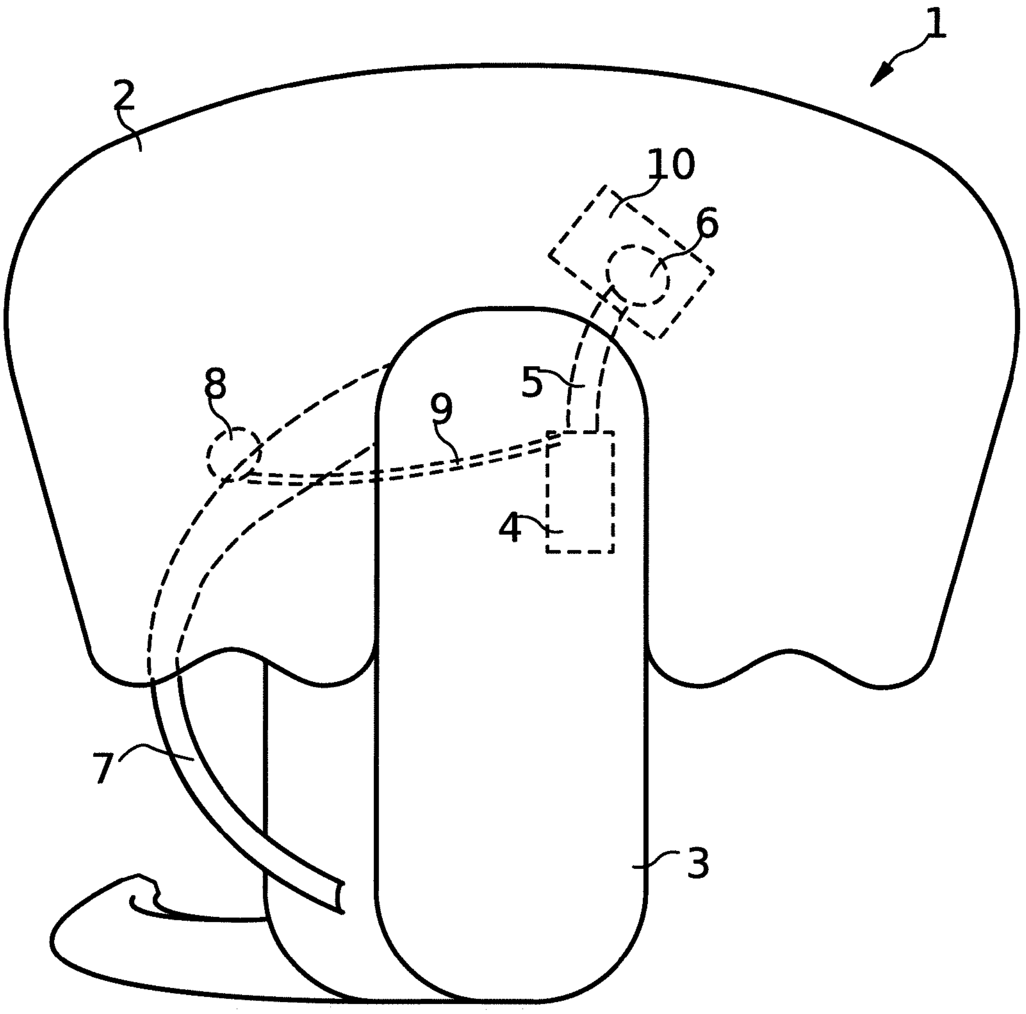

AVALANCHE AIRBAG, METHOD FOR MANUFACTURING AN AVALANCHE AIRBAG AND AVALANCHE AIRBAG SYSTEM

This invention relates to an avalanche airbag for an avalanche airbag system. Furthermore, the invention relates to a method for manufacturing an avalanche airbag and an avalanche airbag system comprising such an avalanche airbag.

Avalanche airbag systems serve to protect persons in the event of being buried by an avalanche. Such airbag systems have as one of their principal components an airbag that in case of need can be rapidly inflated in order to create additional lift. The inflated airbag increases the volume of the person held by the airbag who, for example, is wearing a backpack with the activated avalanche airbag system. This reduces the probability that the person will be buried by masses of snow. Therefore, the airbag for the avalanche airbag system is subject to, among others, the requirement that the airbag be sufficiently gas-tight for a certain time and under increased pressure and does not immediately collapse after inflating.

Furthermore, the avalanche airbag must be designed to withstand high mechanical stresses that could be exerted on the airbag or avalanche airbag. Because with an avalanche airbag, contact with rocks, trees or the like may also occur, so that the airbag may be subjected to very high stresses for short periods. If the airbag withstands internal pressure of 0.3 bar for at least three minutes and if the airbag's material also fulfills the statutory requirements, e.g. for tensile strength and tear resistance, it must be assumed that the airbag will survive avalanche situations well.

Avalanche airbags must fill as quickly as possible after activation and must maintain a volume of at least 150 liters over at least 3 minutes. After activation, the volume of at least 150 liters must be contained in the airbag within a maximum of 5 seconds with slight overpressure. This is normally achieved by means of sufficiently gas-tight coated airbag materials.

The pack volume of known avalanche airbags is relatively high because it is difficult to pack the airbag very tightly. This becomes particularly difficult at low temperatures because the airbag materials used become significantly more rigid and inflexible at low temperatures. This leads to the fact that more energy must be expended to deploy the avalanche airbag.

It is very important that the avalanche airbag can be stowed in the backpack with the least possible volume. Defined folding according to directions is often the way to achieve a low pack volume. Even with optimal folding, however, the pack volume will always still be relatively high. For the user it would naturally be best if he did not have to fold the avalanche airbag at all, but rather could simply stuff it back into the backpack.

EP 0 957 994 B1 discloses an avalanche rescue system with an avalanche airbag containing a buoyancy body with a two-chamber construction whereby the outer jacket consists of uncoated polyamide fabric and the inner balloon of PU-coated polyamide fabric. Allegedly such an avalanche airbag can be folded substantially smaller or "crumpled", whereby the pack sizes are also allegedly decreased.

The problem of the present invention is to further develop and improve an avalanche airbag of this type with a two-chamber structure, and to create a method for manufacturing such an avalanche airbag and an avalanche airbag system comprising such an avalanche airbag.

This problem is solved by means of an avalanche airbag, a method for manufacturing such an avalanche airbag and an avalanche airbag system comprising such an avalanche airbag with the features of the independent claims. Advantageous embodiments of and improvements to the invention are specified in the subordinate claims and in the following description.

The avalanche airbag pursuant to the invention comprises a deployable first bag or outer bag, whereby a deployable second bag or inner back of the avalanche airbag is arranged inside the outer bag. The outer bag may be termed "outer airbag" or "first bag" and the inner bag may be termed "inner airbag" or "second bag". In particular, hereinafter the terms "first bag" and "outer bag" on the one hand, and "second bag and "inner bag" will be used synonymously. The outer bag and the inner bag are two individual bags, whereby only the inner bag is gas-tight. Here the outer bag and the inner bag may be attached to one an other in places, i.e. partially.

The outer bag consists of a flexible, gas-permeable material. The flexibility and gas-permeability of the outer bag facilitate folding and packing and beyond that, allow for low weight and small pack volume without air pockets.

The inner bag, on the other hand, consists of a gas-tight and elastic material, whereby the inner bag or second bag can be inflated with gas. Due to the gas-tightness of the material of the inner bag, upon and after deployment of the airbag or avalanche airbag no, or as good as no, gas can escape the filled airbag through the material of the inner bag. Aside from that, the material of the inner bag can be stretched, whereby the elasticity of the material of the inner bag is between 25% and 500%, preferably a minimum of 50%, especially preferably some 300%. Elasticity is to be understood as the property of a material to change shape un der exertion of force. The elasticity tells how far a material can be extended without breaking or tearing. If external forces are exerted on the outer bag, these may be transferred to the inner bag. In the case of an avalanche, branches or rocks can impact the outer bag and the forces are accordingly passed on to the inner bag. Due to the elasticity of the material of the inner bag, the inner bag absorbs the deformations transferred from the outer bag very well without tearing. The elasticity of the inner bag material of preferably up to 300% prevents the tearing of the inner bags in such extreme situations.

The first bag, consisting of the flexible, gas-permeable material, is preferably only deployable, but not, or barely, elastic. On the other hand, the gas-tight material of the second bag or inner bag exhibits elasticity of at least 25%. Consequently the elasticity of the gas-tight material of which the second bag or inner bag consists, of at least 25%, preferably at least 50%, especially preferably 300%, is greater than the non- (or as good as non-) elasticity of the flexible and gas-permeable material of which the deployable first bag consists. So that even if there is some slight elasticity of the flexible, gas-permeable material of the deployable first bag or outer bag, the elasticity of the gas-tight material of which the second bag consists is significantly greater, namely at least 25% greater.

Thus if, for example, a branch or the like impacts the inflated avalanche airbag from the outside, an indentation or the like may be formed the flexible, gas-permeable material of the first bag. The formation of such an inelastic deformation in the material of the first bag or outer bag may cause an elastic deformation of the elastic material of the second bag or inner bag. Here the comparatively high elasticity of the material of the inner bag means that the inner bag does not tear. This is advantageous because such a leakage of air and/or gas from the inflated avalanche airbag is prevented to an especially great degree and consequently the avalanche airbag maintains its protective function.

Particularly if the outer bag and the inner bag are attached to one another only in places and not across their entire surfaces, as a result of the formation of an indentation or dent in the material of the outer bag there may be stress on the material of the inner bag to stretch. Therefore the greater elasticity of the inner bag, which is at least 25% greater than that of the outer bag, is advantageous particularly in the event of stresses to the outer bag from outside in which due to the elasticity of the inner bag there may be movement of the inner bag relative to the outer bag.

Furthermore, the elasticity of the gas-tight material of the inner bag means that when stowed in a backpack of the avalanche airbag system, the avalanche airbag is particularly easy to pack. This is true in particular if the second bag or inner bag, consisting of the gas-tight and elastic material, is attached to the outer bag only in places. Because even in packing the avalanche airbag, there may be relative movements between the flexible, non-elastic outer bag and the elastic or stretchable inner bag.

The avalanche airbag allows rapid deployment after activation over a broad temperature range as well as a small pack volume with low overall weight of the avalanche airbag.

In its inflated state, the outer bag has a prescribed contour, whereby upon inflation the inner bag, due to its elasticity, can adapt to the contour of the outer bag. After activation of the airbag the internal pressure prevailing in the inner bag presses the airtight inner bag tightly to the bearing outer bag. Thus the inflation of the inner bag and the resulting elastic stretching of the inner bag can lead to the fact that the inner bag hugs the inner side of the outer bag. Here it is advantageous for the prescribed contour of the outer bag to limit any further stretching of the material of the inner bag. This is necessary because the flexible, gas-permeable material of which the first bag or outer bag consists or is formed, is at least largely inelastic or as good as non-stretchable.

The greater elasticity of the inner bag or first bag as compared to the substantially non-elastic outer bag makes it possible for the inner bag in the uninflated state of the avalanche airbag to be configured as smaller, in particular significantly smaller, than the outer bag in the uninflated state of the avalanche airbag. Because the inner bag, due to its elasticity upon inflation, can adapt to the contour of the outer bag. Such a configuration is advantageous with a view to particularly easy packing or stowing of the avalanche airbag, in which the avalanche airbag may, for example, be folded and/or crumpled.

Moreover, the contour and/or shape of the outer bag when deployed but not yet brought into the prescribed shape or contour through the inflation of the inner bag, and the shape and/or contour of the inner bag when formed of elastic material, but not yet inflated, may differ from one another. Accordingly, these shapes and/or contours need not be similar to one another. Because due to the elasticity of the material of the inner bag, after inflation the inner bag can also adapt to the prescribed contour of the outer bag and thus fill up the outer bag if the contour and/or shape of the inner bag in its uninflated state does not differ from the contour and/or shape of the outer bag in its uninflated state. This results in a high degree of flexibility in designing the respective bags. This is also advantageous with regard to easy packing or stowing of the uninflated or unfilled avalanche airbag.

Thus while the outer bag or first bag can attain its prescribed shape or contour in an inflated state of the avalanche airbag purely through deployment and preferably without stretching of the material of the first bag, it may be provided for the inner bag or second bag that due to its elasticity it adapts to the contour of the first bag.

The inner bag itself also has a prescribed contour, whereby the two contours of the outer bag and inner bag may be configured such that if the outer bag and the inner bag are laid out flat, one on top of the other, they are nearly congruent to one another and thus similar to one another. Accordingly, the contour of the inner bag may as large as or slightly smaller than the contour of the outer bag. However, if the contour of the inner bag when laid out flat or uninflated differs slightly from the contour of the outer bag laid out flat, due to the elasticity of the material of the second bag, the second bag can be quite easily adapted to the prescribed contour of the first bag by inflation. In this way any undesirable severe stretching of the inner bag upon inflation thereof can be avoided. This means that a relatively great further elasticity of the material of the inflated inner bag remains if, for example, a branch, a tree, a rock of the like should impact the outer bag of the inflated avalanche airbag from outside. This is advantageous.

During inflation of the inner bag the outer bag is deployed along with the inner bag. The inflation of the inner bag ends when the outer bag has been fully deployed. Although at this point the outer bag and the inner bag are two separate bags, they substantially adapt their contours to one another.

Thus it is not necessary that the material of the outer bag be gas-tight, since due to the gas-tightness of material of the inner bag, the gas that the inner bag deploys cannot escape. This provides significantly greater freedom in the selection of the material for the outer bag; for example, knits or lattices with openings of up to 10 mm are also conceivable.

Pursuant to one variant of the embodiment the outer bag and the inner bag each have a gas inlet opening, whereby peripheral areas of the outer bag are attached to one another and enclose the inlet opening of the outer bag, and peripheral areas of the inner bag are attached to one another and enclose the inlet opening of the inner bag. Peripheral areas means the areas along the edges of the cut material from which the respective bag is produced. The two inlet openings preferably look similar, whereby the inlet opening of the outer bag may be somewhat larger than the inlet opening of the inner bag. Preferably the two inlet openings are connected to one another in a gas-tight manner by a retaining ring that fixes the two inlet openings on a gas feed hose or similar air inlet channel in such away that gas does not escape from the inner bag. The two inlet openings also cannot be firmly connected to one another in the area of the inlet openings, particularly as long as it is ensured that the inner bag is supported by the outer bag.

Preferably the outer bag and the inner bag are attached to one another at multiple points and/or at multiple places on their surfaces. This results in very good mobility of the inner bag relative to the outer bag. On the one hand, this is advantageous for the easy and quick packing or wrapping of the avalanche airbag when transferring the avalanche airbag to a stowed position. On the other, this allows for advantageous and extensive exploitation of the elasticity of the inflated inner bag if the outer bag of the avalanche airbag is impacted from outside, such as by a branch and/or a rock or the like.

The outer bag and the inner bag may, in particular, be attached to one another outside of the peripheral areas, e.g. at points. This means that a side of the outer bag facing the inner bag and a side of the inner bag facing the outer bag are attached to one another at at least one point that is preferably not located on the peripheral areas. Preferably the attachments at points is accomplished by gluing or welding.

The outer bag and inner bag may also be attached to one another over their surfaces at places, particularly outside the peripheral areas. This means that a side of the outer bag facing the inner bag and a side of the inner bag facing the outer bag are attached at at least one surface, which preferably does not include the peripheral areas, whereby the outer bag and the inner bag are not attached to one another over their entire surfaces. Preferably the attachment to the respective surface areas is accomplished by gluing or welding.

The distancing of the places at which the outer bag and the inner bag are attached to one another from the peripheral areas of the outer bag and the inner bag is advantageous, particularly with regard to easy folding and/or putting together and/or wadding when stowing the avalanche airbag, i.e. when placing the avalanche airbag into its stowed position.

It is advantageous if the outer bag is attached to the inner bag at multiple places. This prevents a large crease from forming when packing, which could prolong the time needed to deploy the avalanche airbag.

Preferably the material of the outer bag is a textile material. This textile material is a soft, adaptable and flexible material that is manufactured by creating a network of yarn or thread. Textile material is particularly well-suited to give the first bag or outer bag the desired flexibility and at the same time a high resistance to mechanical stresses.

Thus it is important that the outer bag exhibits sufficient tensile strength and tear propagation resistance. These magnitudes are preferably determined with a standardized tensile test. The tensile strength of the material of the outer bag is preferably at least 1500 N/5 cm according to EN-ISO 13934-1 in warp and weft, and the tear propagation resistance is preferably at least 70 N according to EN-ISO 13937-2 in warp and weft. Such resistances are particularly suited to prevent any damage to the outer bag, such as due to the impact of a force from outside by branches and/or rocks. At the same time these resistances ensure that the deployed outer bag, brought to its prescribed shape and/or contour by means of the inflated inner bag, is highly dimensionally stable.

The material of the outer bag may, for example, be woven or knitted from a polymer, in particular a polyamide, polyolefin or polyester, e.g. made of polyamide 6.6, UHMWPE (e.g. from Dyneema) or aromatic polyamide (e.g. Kevlar). Such textiles, due to the cohesion of their yarns and/or threads are particularly well-suited to give the outer bag both the desired flexibility and foldability and at the same time the desired tensile strength and tear resistance.

Polyamide 6.6 is a semi-crystalline polyamide that is characterized by high heat deflection temperature and low water absorption. For example, the textile known under the name PA 6.6 Nylon Cordura Ripstop 210D has proven to be particularly well-suited because through its ripstop effect it offers high tear propagation resistance with a low surface weight. Ultrahigh-molecular-weight polyethylene (UHMWPE) is chemically similar to the known thermoplastic polyethylene, but has very long molecular chains with a molecular mass of more than 3.5 million g/mol. Furthermore, the material of the outer bag may also consist of hybrids of the aforementioned materials. The outer bag may consist of a high-strength polyester film, e.g. with the trade name “Mylar”.

Preferably the yarns and/or threads of the material of the outer bag have a denier between 50 dtex and 150 dtex, preferably of about 110 dtex. Denier of yarns is a measure of their thickness, diameter or strength. The smaller the diameter of such a structure, the finer it is. Such comparatively fine threads or yarns facilitate the folding of the outer bag when stowing the avalanche airbag and the deployment of the outer bag upon inflation of the avalanche airbag. Moreover, due to the use of such fine threads or yarns the weight per surface unit of the outer bag can be kept relatively low.

The surface weight of the outer bag should be between 80 $g/m^2$ and 130 $g/m^2$; and the grammage of the outer and inner bag should together reach a maximum of 140 $g/m^2$. In the ideal case the total surface weight of both bags should be under 100 $g/m^2$. Manufacturers of the material of the outer bag include, for example, the companies Hoyu, Taiwan; TomLong, Taiwan; Hwa-sung; Korea; IBQ Barcelona, Spain.

Preferably the material of the inner bag consists of thermoplastic polyurethane (TPU) or silicone elastomer, or the material of the first bag comprises a thermoplastic polyurethane (TPU) and/or a silicone elastomer. By means of such polymers it is particularly easy to provide the desired gas-tightness and at the same time high elasticity of the material of the second bag or inner bag.

Thermoplastic polyurethane belongs to a class of polyurethane plastics with many properties that are advantageous for this use, particularly high elasticity and resistance. From a technical perspective these are thermoplastic elastomers that consist of linear, segmented block copolymers that are comprised of hard and soft segments. Silicone elastomer most commonly refers to silicone-based polymer that is vulcanized. The material of the inner bag may also consist of hybrids of the aforementioned materials.

Preferably the material of the inner bag has a thickness of 20 μm to 50 μm. This is advantageous with regard to good elasticity of the material of the inner bag and low weight thereof. Aside from that it is preferred if the material of the inner bag has a weight of 20 $g/m^2$ to 50 $g/m^2$. This way the weight of the avalanche airbag can be kept low. An ether-TPU, i.e. an ether-based thermoplastic polyurethane such as Platilon 4201 AU from Covestro has shown itself to be a preferred material for the inner bag.

Pursuant to one variant of the embodiment the outer bag is formed from at least two layers that in the finished outer bag lie one on top of the other and that are attached to one another along their peripheral areas. The finished inner bag is likewise formed out of at least two layers one on top of the other that are attached to one another in a gas-tight manner along their peripheral areas, whereby the at least two layers of the inner bag are arranged between the at least two layers of the outer bag. Thus it is possible to ensure that, for one thing, no air or gas can escape from the inner bag when the avalanche airbag is being inflated or remains inflated. At the same time the inner bag is very well protected by the outer bag, which encloses the inner bag. This is advantageous for the high functional efficiency of the avalanche airbag.

The two layers in the inner bag that lie one on top of the other can each consist of either two cuts of material or of one cut of material correspondingly folded over. Between the two layers of the outer bag a recess is created in which the inner bag is located. Between the two layers of the inner bag a recess is created into which the gas for inflation of the avalanche airbag is filled. Preferably the attachment of the at least two layers of the outer bag is accomplished by sewing and/or welding. Preferably the gas-tight attachment of the at least two layers of the inner bag is accomplished by gluing and/or welding.

Use of the inflated airbag is associated with high stresses, particularly at the attachment points or seams. When placing seams on the outer, preferably textile, layer, however, gas-tightness need not be taken into account, because the gas-tightness is provided through the inner layer. That means that when producing stable seams the seams do not need to be sealed subsequently.

The welded seams and/or glued places produced from the attachment of the at least two layers of the inner bag are preferably placed such that outside the welded seams and/or glued places a material overhang remains, which can be used to attach the outer bag to the inner bag. The provision of such a material overhang and the use of the material overhang to attach the outer bag to the inner bag in the area of the material overhang is advantageous to good cohesion of the two bags of the avalanche airbag.

Preferably the seams that are created in attaching the layers of the outer bag are single or double T seams or overlap seams. These types of seams are characterized by especially high resistance, particularly to tensile load. This is advantageous with regard to the resistance of the first bag to stresses impacting it from outside and/or inside.

Preferably an anti-blocking agent is added to the material of the at least two layers of the inner bag to prevent the at least two layers of the inner bag from sticking or adhering to one another. If the avalanche airbag is not deployed for a very long time, the layers of the inner bag, which may consist, for example, of TPU, are stored for a long time pressed tightly against one another. If the inner bag consists, for example of TPU film, in this case there is a risk of the layers of the inner bag sticking or adhering. This phenomenon can be prevented by charging the layers of the inner bag with the anti-blocking agent.

The provision of the anti-blocking agent therefore supports good functional efficiency of the avalanche airbag, particularly with regard to easy and effortless inflation thereof. In particular, the finished inner bag may be provided with a small quantity of talcum in order to reliably prevent the sticking or adhering of the inner bag.

It is advantageous if the inner bag in the area of the peripheral areas along which the layers of the inner bag are attached to one another in a gas-tight manner has a reinforcement layer between the at least two layers of the second bag, because it may be that a welded seam along the peripheral areas reduces the material strength. By providing the reinforcement layer the material strength in the area of the gas-tight attachment of the peripheral areas to one an other can be increased. This leads to increased robustness of the inner bag in the area of the gas-tight attachment of the layers of the inner bag to one another.

This reinforcement layer is preferably laid down before the gas-tight attachment between the layers of the inner bag to be attached. Then the area of the reinforcement layer that lies outside the seam or welded seam is removed. The reinforcement layer is thus present substantially as a flat band that serves to reinforce the attachment regions of the inner bag. Preferably the attachment of the reinforcement layer to the two layers of the second bag is accomplished by gluing and/or welding. The reinforcement layer serves to increase the strength of the attachment of the at least two layers of the inner bag.

An especially preferred material for the reinforcement layer is a material that is identical or equal or similar to the material from which the inner bag is formed (i.e. such as TPU or silicone elastomer). This facilitates the inclusion of the reinforcement layers when attaching the layers of the material of the second bag to one another and makes it especially easy to work with the reinforcement layer together with the layers of the second bag.

Preferably the thickness of the reinforcement layer is 25 μm to 50 μm. This allows the reinforcement layer to be worked easily, particularly in making a welded seam by which the layers of the material of the second back can be attached to one another in a gas-tight manner. At the same time, the extent of any increase in the weight of the inner bag or second bag caused by the reinforcement layer is negligible.

The finished avalanche airbag is preferably combined with an airbag filling system and integrated into a backpack or arranged on the backpack. The avalanche airbag system pursuant to the invention thus comprises a backpack, an avalanche airbag pursuant to the invention or avalanche airbag manufactured pursuant to the invention arranged in or on the backpack and an airbag filling system connected to the avalanche airbag.

The airbag filling system serves to force air and/or another gas into the avalanche airbag in such a way that the avalanche airbag is filled as rapidly as possible. The air used for filling can originate in the environment and by means of a blower or similar apparatus the avalanche airbag can be filled, whereby the blower or the apparatus is preferably driven or supplied with electrical energy by at least one electrical energy storage device, in particular by a super capacitor or a number of super capacitors. The gas used for filling can come from a container under pressure, for example a gas cartridge, and due to the overpressure in the cartridge, be forced into the avalanche airbag. Preferably when using the cartridge for the airbag filling system, the avalanche airbag is filled with both the gas coming from the cartridge and with ambient air that, due to the escape of the gas from the cartridge is sucked in from the surrounding. The cartridge is usually stowed in the backpack in which the avalanche airbag is also stowed.

The avalanche airbag pursuant to the invention has the following technical advantages and effects.

Since the outer bag that is responsible for the mechanical strength of the avalanche airbag consists of the gas-permeable material, this material can be very adaptable, soft and light. The material of the outer bag is therefore very light and can be packed into a very small space. Aside from that, this material can be intentionally an isotropically reinforced in order to strengthen areas subject to stress. For the inner bag a very thin, light and gas-tight material is used. Thus the avalanche airbag as a whole becomes lighter and achieves a very small pack volume as well as a very short activation time at low temperatures.

The gas-tightness of the inner bag is high and it is therefore not necessary after activation of the avalanche airbag to supplement with more air or gas. This means that less energy is needed to fill the avalanche airbag, especially with electrically powered systems. This is important because the capacity of the power storage or electrical energy storage of the airbag filling system is limited and this power storage should be of low weight. Aside from that, due to the need for less energy to deploy the avalanche airbag, the energy supply can be correspondingly lower, whereby the weight and the volume of the avalanche airbag system as a whole is lower.

A method pursuant to the invention for manufacturing an avalanche airbag that comprises an inner bag and an outer bag comprises at least the following steps.

At least two layers of a first material and at least two layers of a second material are cut as needed. The two layers of the first material may consist of two corresponding cuts or of one cut that is folded along a prescribed line and overlaid so that the two layers are already attached on one side. This also applies to the two layers of the second material. The cut layers of the first material are of any shape and as identical as possible to one another. The shape of the cut layers of the first material should preferably be similar or identical to the shape of the cut layers of the second material. This simplifies the manufacture of the avalanche airbag.

However, it can also be provided that the shape of the cut layers of the second material provided to form the inner bag or second bag differs from the shape of the cut layers of the first material provided to form the first bag or outer bag. Because due to the elasticity of the second material, when inflating the avalanche airbag, the shape of the inner bag can adapt to the shape of the outer bag deployed as a result of the inflation.

The at least two layers of the second material are then placed one on top of the other and attached to one another in a gas-tight manner in order to form the inner bag. Preferably the gas-tight attachment is done by welding or gluing. The gas-tight attachment is preferably done along the peripheral areas of the at least two layers of the inner bag.

In order to position the inner bag within the outer bag, the outer bag may be produced around the finished inner bag. For this the at least two layers of the first material are placed one over the other such that the inner bag is located between the layers of the first material. The inner bag is preferably placed between the layers of the first material such that the inner bag is completely enclosed on all sides by the layers of the first material. Then the layers of the first material are attached to one another in order to form the outer bag. Thus the avalanche bag can easily be manufactured from the respective layers of the first material that form the first bag and the layers of the second material that form the second bag. At the same time, advantageously, the first bag or outer bag and the second bag or inner bag are configured as two individual, self-contained bags. This is because in the provision of the outer bag no attention need be paid to the gas-tightness and in the provision of the inner bag the requirements for the resistance of the material of the inner bag to stresses from outside are lower than for the provision of the outer bag.

Preferably a flexible, gas-permeable material will be used as the first material from which the deployable first bag is formed, whereby for the second material from which the deployable and gas-inflatable second bag is formed a gas-tight, elastic material is used, whereby the second bag is arranged inside the first bag. Furthermore, the material of the second bag has an elasticity of at least 25%. The advantages for the avalanche airbag explained in this regard also apply with regard to the method for manufacturing the avalanche airbag.

Preferably the attachment of the layers of the first material is accomplished by sewing, welding or gluing. The attachment is preferably done along the peripheral areas of the at least two layers of the first material, so that the inner bag is completely enclosed by the at least two layers of the first material. This ensures that the second bag or inner bag is very well protected by the stable and resilient outer bag.

Furthermore, the avalanche airbag may also be manufactured as follows. The at least two layers of the first material and the at least two layers of the second material are again cut as needed. The layers of the first material are laid one on top of another and attached to one another in order to form the outer bag. Preferably the attachment of the layers of the first material is accomplished by sewing, welding or gluing. The attachment is preferably done along the peripheral areas of the at least two layers of the first material, but remains interrupted at one area so that an inlet opening is created through which the outer bag and the inner bag can later be drawn (and thereby turned). Such a special opening or inlet opening may also be omitted if an airbag air inlet opening that is already present is dimensioned in such a way that the airbag or avalanche airbag can be turned through this air inlet opening. Then the at least two layers of the second material are laid one on top of another so that the outer bag is located between the layers of the second material. Then the layers of the second material are attached to one another in a gas-tight manner in order to form the inner bag. Preferably the gas-tight attachment is accomplished by welding or gluing. Once again, the gas-tight attachment is preferably done along the peripheral areas of the two layers of the inner bag and is interrupted to the extent that an inlet opening on the inner bag is created through which the outer bag and the inner bag can be turned, so that the inner sides then lie on the outside. For turning, the outer bag is drawn out of the inner bag through the opening or inlet opening of the inner bag and at the same time turned through the opening of the outer bag from inside to outside. Then the inner bag is pushed through the opening in the outer bag into the outer bag and at the same time turned through the opening or inlet opening of the inner bag from inside to outside.

Alternatively the outer bag and inner bag may simultaneously be drawn through the inlet openings of the outer bag and the inner bag and thereby turned together. Pursuant to a preferred variant, the inlet openings on the outer bag and inner bag. may thereafter be further used to fill the inner bag with air and/or a gas using the airbag filling system. The advantage of turning is that the seams in the finished avalanche airbag lie inside. Consequently the seams are well protected and any damage to the seams can be to a large extent be avoided.

The cutting of the layers of the first material and the second material may, for example, be accomplished with the help of a laser cutter. With a laser cutter it is possible to cut a variety of materials such as TPU precisely according to a digital template to 0.1 mm. As with a cutting plotter, it is preferably required that first a two-dimensional graphic or drawing, for example, is created on the computer. This can be implemented with the aid of a vector graphic program, e.g. Inkscape.

Furthermore at least one reinforcing element may be provided on the outer bag to fix the avalanche airbag to the backpack and/or in a carrier system of the backpack may be provided. Preferably the reinforcing element is a tear-proof textile with which the avalanche airbag is attached to the backpack or its carrier system. The pull-out strength for the reinforcing element between the avalanche airbag and the backpack is preferably at least 3,000 N. It is advantageous that the reinforcing element may be constructed on the outer bag without regard to the gas-tightness of the airbag, since the outer bag need not be gas-tight. This creates a high degree of freedom in the design of the attachment of these reinforcing elements between the backpack and the avalanche airbag.

The avalanche airbag system preferably comprises the backpack, the avalanche airbag arranged on the backpack or in the backpack, the airbag filling system connected to the avalanche airbag, and an activation system. The airbag filling system serves to fill the avalanche airbag with air and/or another gas. As stated, the air or gas may come from the environment and/or from a cartridge and is preferably forced through the two inlet openings of the outer bag and the inner bag into the interior space of the inner bag. The backpack substantially serves to properly stow the avalanche airbag and the airbag filling system and to hold the avalanche airbag to the user after activation.

The advantages described for the avalanche airbag pursuant to the invention and preferred embodiments apply analogously for the method pursuant to the invention and for the avalanche airbag system, and vice versa.

The features and feature combinations cited above in the description and below in the description of the figures are usable not only in the respective combinations specified, but also in other combinations or alone, without departing from the framework of the invention. Thus embodiments that are not explicitly shown or explained in the figures, but that result through separate feature combinations from the embodiments explained and that are feasible, are also to be regarded as included in the invention and disclosed Thus also embodiments and feature combinations that do not exhibit all the features of an originally-formulated independent claim are to be regarded as disclosed. Furthermore, embodiments and feature combinations, particularly through the above-described embodiments, that extend beyond the feature combinations in the back-references to the claims or differ from these, are to be regarded as disclosed.

Figure 2:
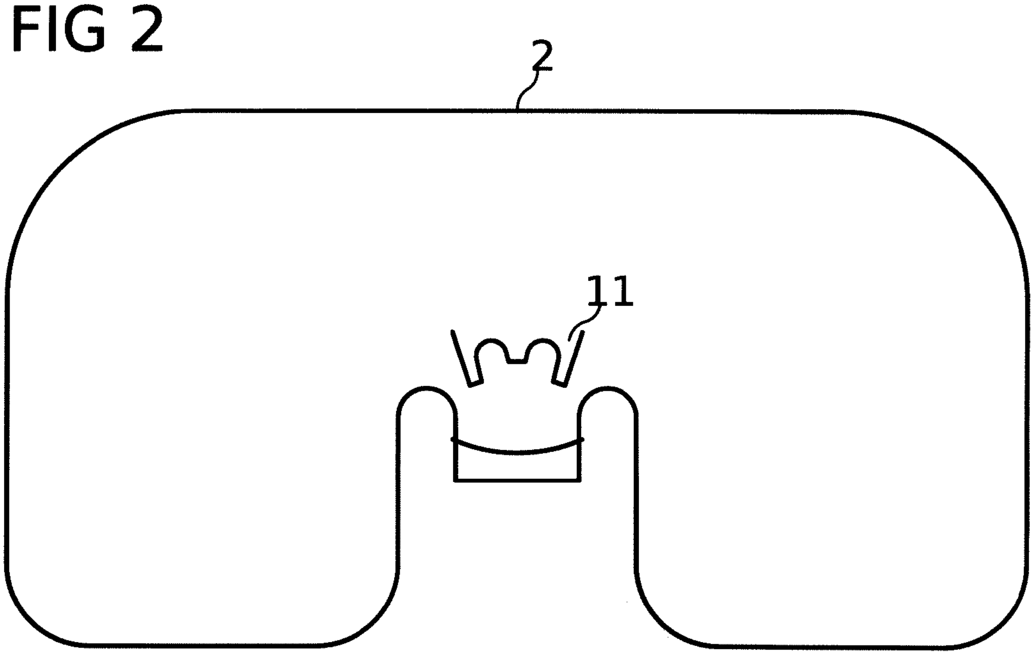
Figure 3:
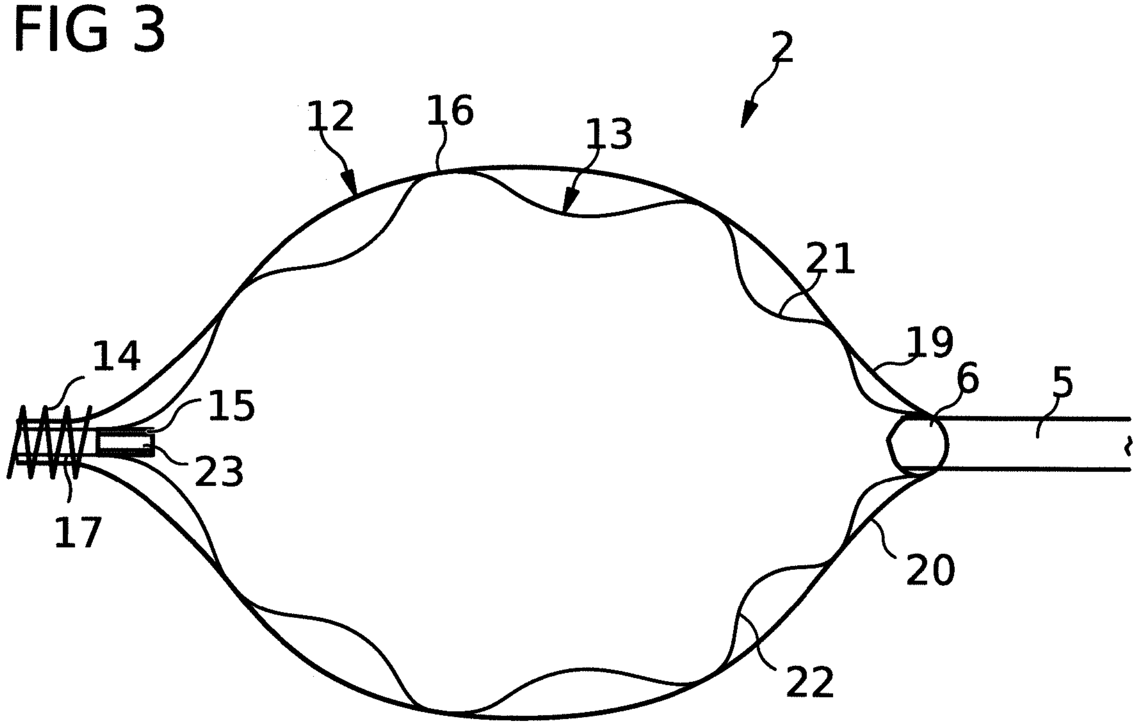
Figure 4:
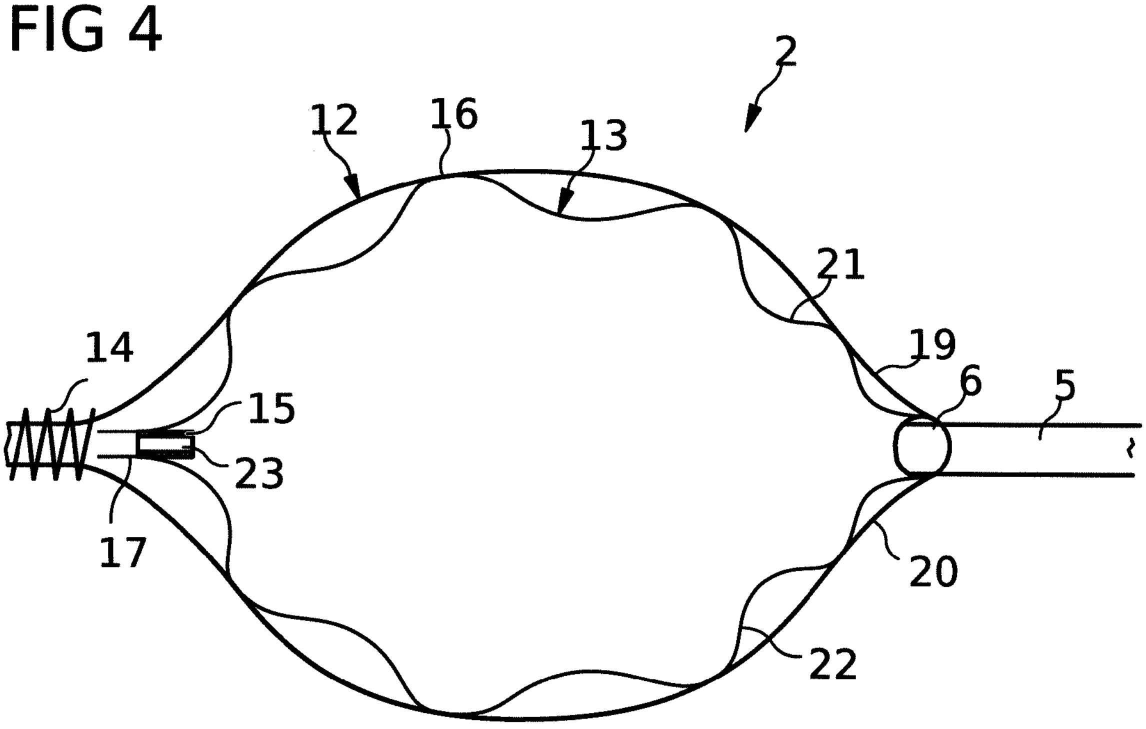
Figure 5:
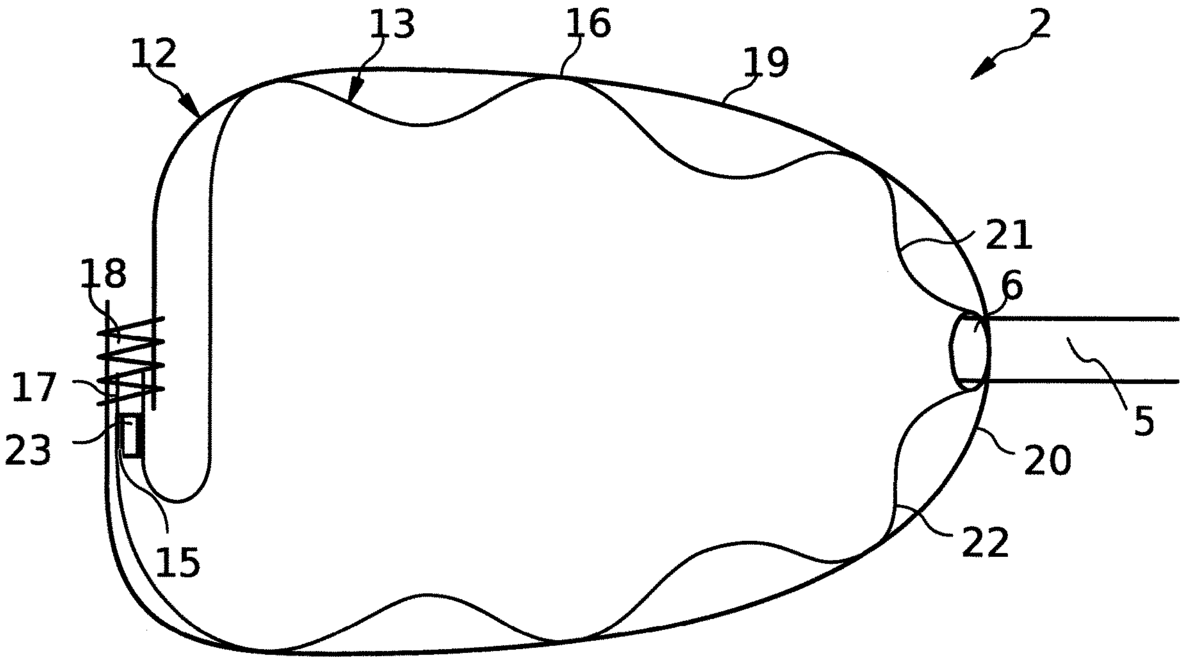

Additional advantages, features and specifics result from the following description of preferred embodiments and from the drawings. These show:

FIG. 1 an avalanche airbag system in a perspective view,

FIG. 2 a reinforcing element of the avalanche airbag in a top view;

FIG. 3 a diagram of the avalanche airbag pursuant to a first variant;

FIG. 4 a diagram of the avalanche airbag pursuant to a second variant;

FIG. 5 a diagram of the avalanche airbag pursuant to a third variant; and

Figure 6:
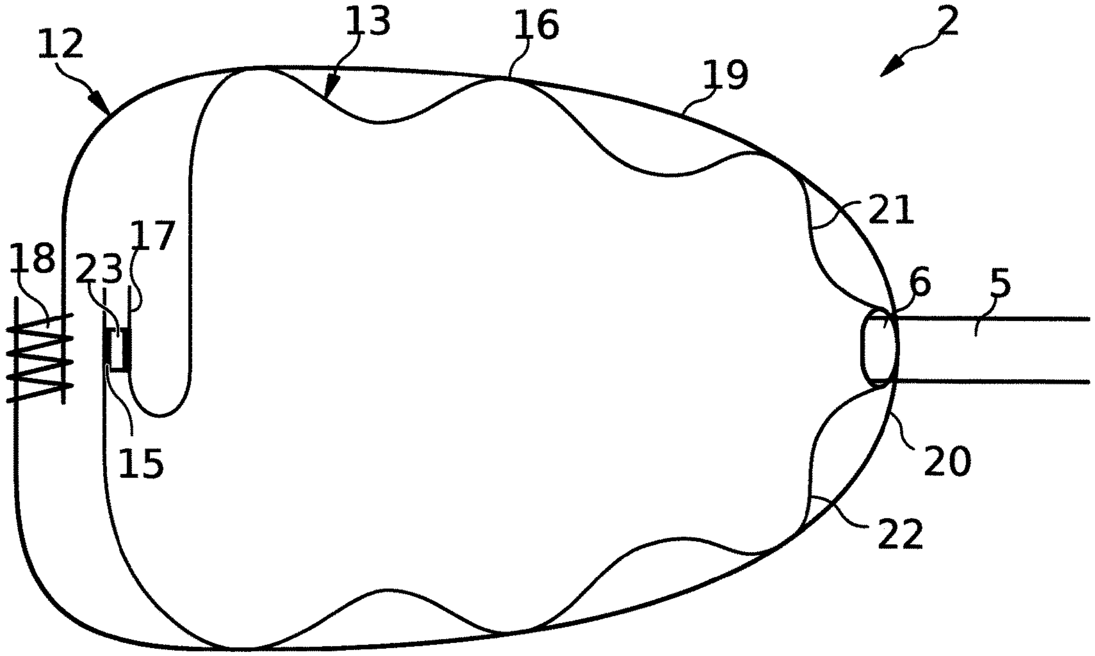

FIG. 6 a diagram of the avalanche airbag pursuant to a fourth variant.

In the figures the equivalent or functionally equivalent elements are provided with identical reference numbers.

FIG. 1 shows a diagram of an avalanche airbag system 1 comprising an avalanche airbag 2, a backpack 3 and an airbag filling system with a filling apparatus 4 to fill the avalanche airbag 2. The avalanche airbag 2 in FIG. 1 is completely inflated by air and/or gas that was forced into the avalanche airbag 2 through an air inlet channel 5 of the airbag filling system.

The filling apparatus 4 is stowed in the backpack 3. Preferably the filling apparatus 4 comprises a blower, an electrical motor to drive the blower and at least one super capacitor or similar electrical energy storage device as energy source to supply the motor, whereby the blower forces the air from the environment through the air inlet channel 5 into the inner bag of the avalanche airbag 2. Alternatively, the filling apparatus 4 may also comprise a cartridge that is filled with gas.

An activation handle 8 affixed to a carrier system 7 of the backpack 3 is connected through a pull cord 9 or the like to the filling apparatus 4. By pulling on the activation handle 8 the filling apparatus 4 can be activated and the filling of the airbag or avalanche airbag 2 effected. Automatic activation by appropriate algorithms or remote activation is preferably also possible. The air inlet channel 5 is connected at one end to the filling apparatus 4 and on the other end to the inlet openings 6 of the avalanche airbag 2, whereby the air inlet channel 5 is connected to the inlet openings 6 through a connecting element 10 in a gas-tight manner. Preferably this gas-tight connection is accomplished by gluing, pressing or welding.

First the avalanche airbag 2 is folded together and stowed in the backpack 3. In order avoid possible burial by snow, the user pulls the activation handle 8, so that the air and/or gas flows out of the filling apparatus 4 through the air inlet channel 5 into the avalanche airbag 2.

FIG. 2 shows the avalanche airbag 2 with a reinforcing element 11 in a top view. The reinforcing element 11 serves to reliably connect the avalanche airbag 2 to the backpack 3. When the avalanche airbag 2 is inflated, the avalanche airbag 2 is connected in a tear-proof manner to the backpack 3 through the reinforcing element 11, so that the user wearing the backpack 3 is able to maintain the additional lift of the avalanche airbag 2 in an avalanche.

FIG. 3 shows, in a diagram of a longitudinal section, the avalanche airbag 2 pursuant to a first example. The avalanche airbag 2 comprises an outer bag 12 and an inner bag 13. The outer bag 12 and the inner bag 13 may be termed “first bag” and “second bag” or “outer airbag” and “inner airbag”, respectively. The inner bag 13 is arranged inside the outer bag 12. The inner bag 13 consists of a gas-tight and elastic material and the outer bag 12 consists of a flexible and air-permeable material.

The outer bag 12 consists of two layers 19, 20. The inner bag 13 consists of two layers 21, 22. The two layers 19, 20 of the material of the outer bag 12 may consist of two material cuts, whereby the two layers 19, 20 are completely separated, or of one cut that is folded along a prescribed line and overlaid, so that the two layers 19, 20 of the outer bag 12 are created.

This also applies to the two layers 21, 22 of the material of the inner bag 13. The inner bag 13 is attached to the outer bag 12 in places, e.g. at points or over the surface. Preferably this attachment at points is accomplished by gluing. The places 16 are thus either points or flat places. The two layers 21, 22 of the inner bag 13 are welded along the peripheral areas of the two layers 21, 22 so that the welded seams 15 are created.

A reinforcing layer 23 lies between the two layers 21, 22 of the inner bag 13 and covers the entire surface of the welded seams 15 in order to reinforce them, whereby the reinforcing layer 23 is preferably a maximum of 100 mm wide. Outside the welded seams 15 there is preferably a material overhang 17 of the two layers 21, 22 of the inner bag 13. In the variant pursuant to FIG. 1 the material overhand 17 lies between the two layers 19, 20 of the outer bag 12 and is sewn to layers 19, 20 of the outer bag 12 in the form of T seams 14, i.e. in seams exhibiting a T shape.

The inlet openings 6 here comprise one inlet opening of the inner bag 13 and one inlet opening of the outer bag 12. The respective inlet openings 6 are preferably connected to one another by welding, clamping or gluing in such a way that the inlet opening of the outer bag 12 encloses the inlet opening of the inner bag 13, whereby the inlet opening of the inner bag 13 den encloses the air inlet channel 5 in a gas-tight manner. The air inlet channel 5 is connected to these inlet openings 6, preferably in a gas-tight manner.

FIG. 4 shows a diagram of the avalanche airbag 2 pursuant to a second example. The second example pursuant to FIG. 4 differs from the first example pursuant to FIG. 3 by means of the fact that a possible material overhang 17 is not attached to the outer bag 12. In this case the welded seam 15 is at a distance from the T seams 14 of the layers 19, 20 of the outer bag 12.

FIG. 5 shows a diagram of the avalanche airbag 2 pursuant to a third example. The third example pursuant to FIG. 5 differs from the first example pursuant to FIG. 3 in that the material overhang 17 lies between the two layers 19, 20 of the outer bag 12 and is sewn to them in such away that the overlap seams 18 are created or formed.

FIG. 6 shows a diagram of the avalanche airbag 2 pursuant to a fourth example. The fourth example pursuant to FIG. 6 differs from the third example pursuant to FIG. 5 in that a possible material overhang 17 of the inner bag 13 lies at a distance from the overlap seams 18 of the layers 19, 20 of the outer bag 12. In this case the welded seams 15 of the inner bag 13 lie at a distance from the overlap seams 18 of the layers 19, 20 of the outer bag 12.

The invention claimed is:

1. An avalanche airbag, comprising a deployable first bag comprising a flexible, gas-permeable material, the first bag including a first inlet opening; and a deployable second bag disposed inside the first bag, the second bag including a second inlet opening, the second bag inflatable with gas and comprising a gas-tight material having an elasticity of at least 25%, wherein the first inlet opening at least partially encloses the second inlet opening.

2. The avalanche airbag according to claim 1, wherein when the first bag is inflated, the first bag has an inflated profile, and wherein when the second bag is inflated, the second bag adapts to the inflated profile of the first bag.

3. The avalanche airbag according to claim 1, wherein the gas-tight material of the second bag comprises a thermoplastic polyurethane, a silicone elastomer, or a combination thereof.

4. The avalanche airbag according to claim 1, wherein the flexible, gas-permeable material of the first bag comprises a textile material.

5. The avalanche airbag according to claim 4, wherein the flexible, gas-permeable material of the first bag has a tensile strength of greater than 1500 N/5 cm in warp and weft and a tear propagation resistance of greater than 70 N in warp and weft.

6. The avalanche airbag according to claim 4, wherein the flexible, gas-permeable material of the first bag is comprised of a woven textile or a knitted textile.

7. The avalanche airbag according to claim 4, wherein the textile material comprises threads and/or yarns having a denier of between 50 dtex and 150 dtex.

8. A method for manufacturing an avalanche airbag having an outer bag and an inner bag, comprising:

cutting at least two layers of a first material, each of the at least two layers having a peripheral edge;

cutting at least two layers of a second material, each of the at least two layers having a peripheral edge;

layering the at least two layers of the second material and securing the at least two layers together along the peripheral edges to form a gas-tight inner bag;

disposing the inner bag between the at least two layers of the first material; and securing the at least two layers of the first material together along the peripheral edges to form an outer bag, wherein the inner bag is disposed inside of the outer bag.

9. The method according to claim 8, further comprising:

creating a material overhang when securing the peripheral edges of the at least two layers of the second material, and securing the material overhang of the inner bag to the outer bag.

10. An avalanche airbag system, comprising:

a backpack;

the avalanche airbag of claim 1, wherein the avalanche airbag is disposed on or in the backpack; and an airbag filling system configured to fill the avalanche airbag.

11. An avalanche airbag system, comprising:

a backpack;

the avalanche airbag manufactured according to claim 8, wherein the avalanche airbag is disposed on or in the backpack; and an airbag filling system configured to fill the avalanche airbag.

12. The avalanche airbag according to claim 1, wherein the gas-tight material of the second bag has a thickness of from 20 μm to 50 μm.

13. The avalanche airbag according to claim 6, wherein the woven textile or the knitted textile comprises a polyamide, a polyolefin, a polyester, or a combination thereof.

14. The avalanche airbag according to claim 1, wherein the first bag and the second bag are attached at one or more locations.

15. An avalanche airbag, comprising a deployable first bag comprising a flexible, gas-permeable material, the first bag formed of at least two layers attached along respective peripheral edges of the at least two layers of the first bag, and a deployable second bag disposed inside the first bag, the second bag formed of at least two layers attached along respective peripheral edges of the at least two layers of the second bag in a gas-tight manner, the second bag inflatable with gas and comprising a gas-tight material having an elasticity of at least 25%, wherein the at least two layers of the second bag are disposed between the at least two layers of the first bag.

16. The avalanche airbag according to claim 15, wherein the at least two layers of the second bag each comprise an anti-blocking agent.

17. The avalanche airbag according to claim 15, further comprising a reinforcing layer disposed between the at least two layers of the second bag.

18. The avalanche airbag according to claim 17, wherein the at least two layers of the second bag are comprised of the gas-tight material, and wherein the reinforcing layer is comprised of the gas-tight material and having a thickness of from 25 μm to 50 μm.

19. The avalanche airbag according to claim 15, wherein the first bag and the second bag are attached at one or more locations.

20. The avalanche airbag according to claim 15, wherein when the first bag is inflated, the first bag has an inflated profile, and wherein when the second bag is inflated, the second bag adapts to the inflated profile of the first bag.

* * * * *